May 1, 1956 L. W. YOUNG 2,743,447
DRIVING GLASSES
Filed March 23, 1953 2 Sheets-Sheet 1

Inventor
Leroy William Young
BY C. B. Messenger
Attorney

May 1, 1956 L. W. YOUNG 2,743,447
DRIVING GLASSES
Filed March 23, 1953 2 Sheets-Sheet 2

Inventor
Leroy William Young
By C B Messenger
Attorney

United States Patent Office 2,743,447
Patented May 1, 1956

2,743,447

DRIVING GLASSES

Leroy W. Young, Arvada, Colo.

Application March 23, 1953, Serial No. 343,880

1 Claim. (Cl. 2—13)

The present invention relates to driving glasses adapted to shield the wearer's eyes from the glare of oncoming automobile lights while driving at night. More particularly, this invention relates to night-driving glasses that are adjustable for use under varying conditions and of a type that may be attached directly to a wearer's eye glasses for use in conjunction therewith.

Among the objectives of the present invention is to provide an attachment for driver's eye glasses that is adapted to support a lens of protective material in front of the wearer's eyes in which the lens or protective shield is of irregular shape such that the glare of oncoming automobile lights may be reduced without blocking normal vision of other parts of the highway over which the driver is traveling.

A further objective of the present invention is to provide night-driving glasses having a lens of irregular shape adapted to reduce the glare of oncoming headlights without substantial reduction in the driver's perception of other portions of the road or highway.

A still further object of the present invention is to provide night-driving glasses having a lens of material adapted to reduce the glare of oncoming headlights, such lens being supported for pivotal movement away from the wearer's field of vision when not in use and said lens being of an irregular shape being adapted to occlude only the wearer's field of view corresponding with the natural position of an approaching automobile when on the opposite side of a highway.

Another object of the present invention is to provide adjustable means for attaching night-driving glasses of the present type to a person's eye glasses.

Other objects and advantages of the present invention will be apparent from the appended description and drawings in which.

Briefly stated, the present invention provides night-driving glasses or a night-driving attachment for eye glasses in which a shield lens adapted to reduce the glare of oncoming headlights is supported in position in front of a driver's eyes when in use and in a raised position out of the wearer's field of view when not in use. Structural members are provided to make both the driving glasses and attachment embodiments adjustable for more convenient usage. The main feature of the present invention is the provision of a protective shield lens of irregular shape that may be moved into and away from the wearer's field of vision. One boundary edge of this shield lens is positioned at an angle with respect to the horizontal support such that when positioned before a driver's eyes the angle that such boundary edge makes with the horizontal substantially corresponds with the angle of perspective view of a highway center line as viewed from the driver's seat of an automobile proceeding down such highway on one side of the center line. The angularity of this boundary edge makes it possible to occlude from the driver's view the glare from headlights of oncoming automobiles on the opposite side of the highway center line without the necessity of having the driver rotate his head and without impairing the driver's vision with respect to objects in his path during his forward progress down his side of the highway.

Figure 1:
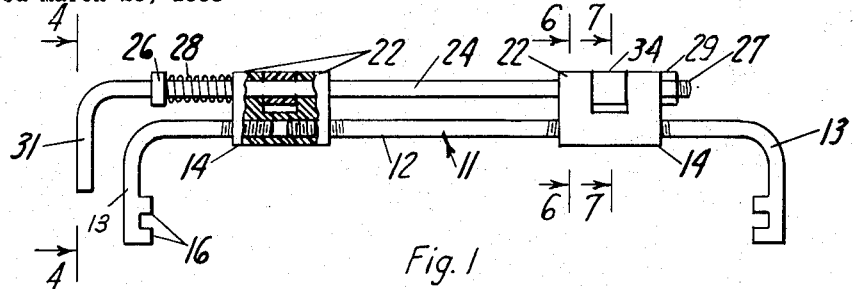
Fig. 1 is a top plan view of a first embodiment of this invention.
Figure 2:
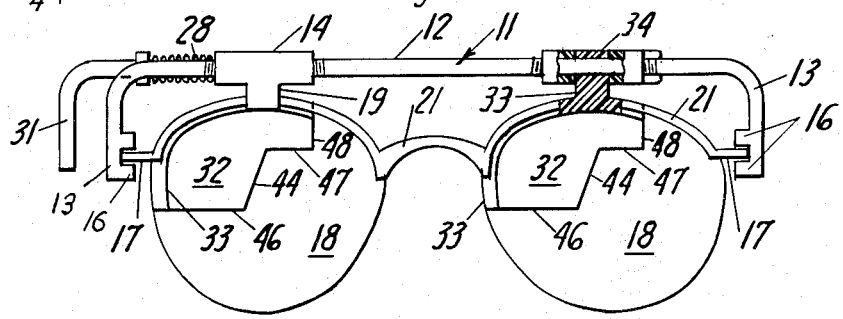
Fig. 2 is a front elevation of the embodiment shown in Fig. 1.
Figure 4:
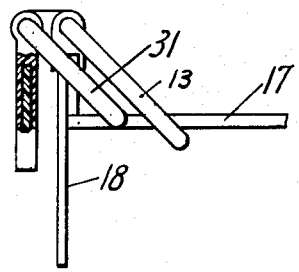
Fig. 4 is a side elevation taken along the line 4—4 of Fig. 1 and showing the driving glasses in position of use.
Figure 5:
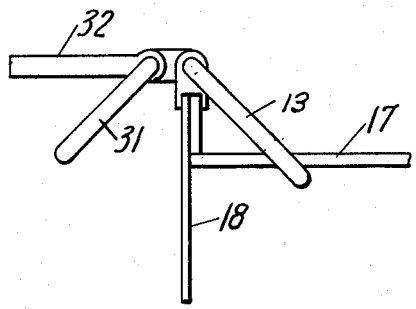
Fig. 5 is a side elevation similar to that shown in Fig. 4 showing the night-driving glasses in raised position out of the wearer's field of view.
Figure 6:
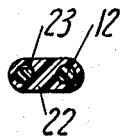
Fig. 6 is a cross-sectional elevation taken along the line 6—6 of Fig. 1.
Figure 7:
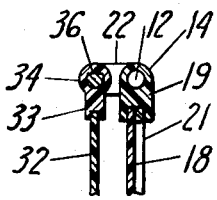
Fig. 7 is a cross-sectional elevation taken along the line 7—7 of Fig. 1.

The detailed features of the present invention will be apparent from the accompanying drawings, in which Figs. 1, 2, 4, 5, 6 and 7 show a first embodiment of this invention which comprises an attachment for use in conjunction with the ordinary eye glasses or spectacles worn by a driver. In Figs. 1, 2, 4 and 5 it will be noted that the inventor provides a support frame 11 which includes a center piece 12 and two end support pieces 13 threadedly engaged with support saddle members 14. Projections 16 are provided on the end pieces 13 for engagement with the bows 17 of a driver's eye glasses 18. A saddle projection 19 on the saddle support 14 rests on the frame 21 or lens of the wearer's eye glasses 18. When properly adjusted so that the length of the center member 12 and end pieces 13 is as desired, the support frame 11 will be securely attached to a wearer's eye glasses 18 as shown in Figs. 2, 4 and 5.

A saddle support member 14 is provided with forwardly extending projections 22 having a drilled horizontal opening 23 therethrough. A pivot shaft 24 is provided for rotating engagement in such opening 23. Pivot shaft 24 itself is provided with a shoulder 26 at one end thereof and threads 27 at an opposite end such that when a spring 28 is positioned between the shoulder 26 and one of the projections 22 and a lock nut 29 is secured to the threads 27, frictional forces exerted by the spring 28 will tend to hold the pivot rod 24 in desired position. As shown, one end of the pivot rod 24 is bent to provide a handle 31 which is useful in adjusting the position of the pivot rod 24.

The driving glass lens 32, which is of plastic or some other material adapted to reduce the glare of a strong light source, is secured to a partial frame 33 which is likewise preferably of a plastic material. Integrally formed with the partial frame 33 is a projection 34 having an opening 35 therethrough. This projection 34 is adapted for positioning between the projections 22 and for engagement with the pivot shaft 24. Through this arrangement rotation of the pivot rod 24 will cause a corresponding rotation of the projection 34, frame 33 and driving lens 32. Accordingly, as shown in Figs. 4 and 5, the driving lens may be positioned either in front of the wearer's eyes, as shown in Fig. 4, or by the simple expedient of rotation of the handle 31 the driving lens 32 may be rotated to an elevated out-of-use position such that no part of the wearer's field of view will be occluded.

Figure 8:
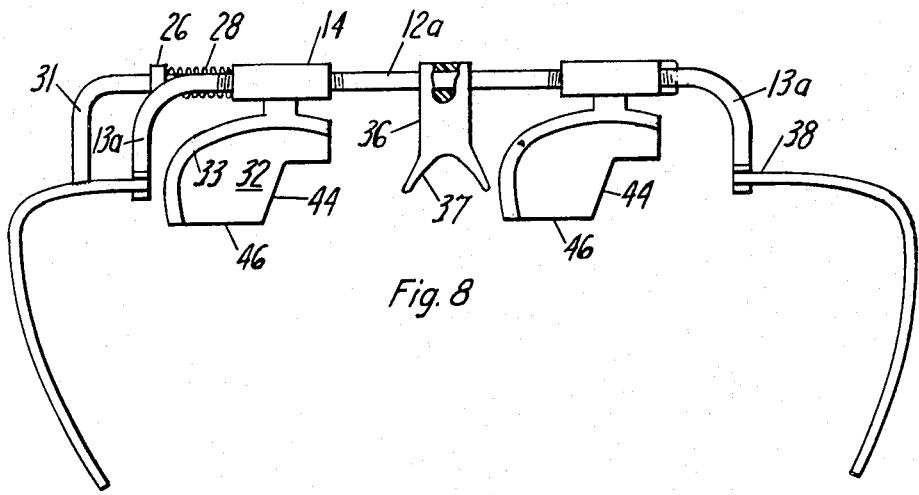
Fig. 8 is an elevation showing the features of a separate embodiment of the present invention.

A modification of the heretofore described device is shown in Fig. 8. In this figure the inventor shows modifications that are necessary to change the attachment previously described into self-supporting driving glasses. As will be evident, most of the parts utilized in this embodiment are of the same nature and structure as those previously described; however, the center support piece 12 is changed such that modified center piece 12a provides a nose piece 36 having a nose bridge 37 adapted to rest on the wearer's nose. Modified end pieces 13a are provided so that regular eye glass bows 38 may be attached to the end of such end pieces 13a. With the provision of the bows 38 and nose piece 36 the night-driving advantages of the present invention will be available to those who do not ordinarily wear eye glasses or spectacles.

Figure 3:
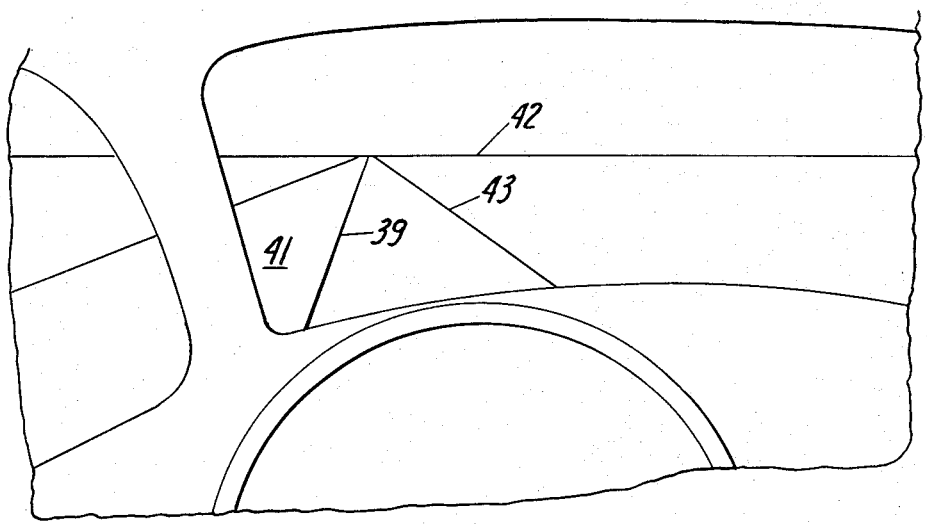
Fig. 3 is a drawing showing the field of view for a driver proceeding down a highway.

An important feature of the present invention as utilized both with the first and second embodiments is the irregular shape of the driving lens 32. In Fig. 3, which represents the driver's field of view, it will be noted that because of a perspective view effect the center line 39 of the highway 41 is at an angle with respect to the horizon 42 such that the center line 39 cuts diagonally across the driver's field of view. While it is highly desirable to be able to shield or reduce the glare of oncoming automobile headlights, it is also desirable that the driver's field of view with respect to the path over which he is progressing should be unimpaired. The driver at all times should especially be able to clearly see the edge 43 of the road 41 along which he is traveling. It has been found that it is possible to reduce the glare of oncoming headlights without impairing the driver's forward vision if a shield lens is provided which has one boundary edge thereof disposed at an angle with respect to the horizontal substantially corresponding with the angle of perspective view of a highway center line as observed from the driver's seat of an automobile traveling down one side of the highway. Accordingly the present invention provides a lens 32 of irregular shape in which one boundary edge 44 is disposed at an oblique angle with respect to a horizontal reference such as the support frame 11 or the bottom edge 46 of such lens. With this angularly disposed edge 44, a driver can position the glasses so that the glare of even a stream of oncoming headlights may be reduced without impairing the wearer's view of his own side of the highway 41.

In addition to the provision of an angularly disposed edge 44, the present inventor has also found it advantageous to provide another boundary edge 47 intersecting said angularly disposed edge 44. This edge 47 is parallel to the bottom edge 46 which substantially corresponds with the horizontal as seen by the wearer. The edge 47, together with vertical edge 48, defines a small area of protective lens 32 which may be used to block the glare from headlights that are directly forward of the wearer's automobile due to a curve in the highway or other factors. Under such conditions the wearer may, by lowering his head slightly, likewise reduce the glare of all such dead-ahead light sources still without impairing his view of objects directly in his path and closer to his vehicle than such dead-ahead light source.

From the foregoing description and drawings, it will be apparent that the inventor provides novel means for accomplishment of the objective set forth; however, since modifications and changes may be made in the device as disclosed without departure from the scope of the present invention, the inventor intends to be limited not by the drawings and description but only by the scope of the hereunto appended claim.

What is claimed is:

Glasses for use while driving at night on highways to reduce the glare of oncoming light sources comprising a center support piece, saddle members adjustably secured to said center piece, end pieces adjustably secured to said saddle members, projections on said end pieces for engagement with the bows of a wearer's eye glasses for supporting said center piece and saddle members in horizontal position adjacent the wearer's eyes, a forwardly extending projection on said saddle members, a pivot rod rotatably mounted in said forwardly extending projections, lens support frames for engagement with said pivot rod whereby rotation of said rod moves said lens alternately to a first position of use in front of the wearer's eyes and to an out-of-way position out of the wearer's field of view, and an irregularly shaped lens in said support frame of material adapted to reduce the glare of oncoming automobile headlights, said lens having a horizontal edge, a first boundary edge above and disposed with respect to said horizontal edge at an angle substantially corresponding to the angle of perspective view of a highway center line as observed from the driver's seat of an automobile travelling down one side of the highway, and a second boundary edge intersecting said angularly disposed edge and parallel with said horizontal edge, said second boundary edge in part defining a projection of said lens extending beyond the line of projection for said first named boundary edge, said lens projection being useful to reduce the glare of light sources directly ahead.

References Cited in the file of this patent

UNITED STATES PATENTS

| | | |
|---|---|---|
| 868,857 | Garner | Oct. 22, 1907 |
| 1,195,326 | Arnold | Aug. 22, 1916 |
| 1,616,967 | Halikman | Feb. 8, 1927 |
| 2,012,620 | Bean et al. | Aug. 27, 1935 |
| 2,109,115 | Kleine | Feb. 22, 1938 |
| 2,511,776 | Kelly | June 13, 1950 |
| 2,601,084 | Brown et al. | June 17, 1952 |

FOREIGN PATENTS

| | | |
|---|---|---|
| 323,885 | Great Britain | Jan. 16, 1930 |